(12) United States Patent
Yamashita et al.

(10) Patent No.: US 10,336,142 B2
(45) Date of Patent: Jul. 2, 2019

(54) DEVICE FOR DETECTING LOW-PRESSURE STATE OF TIRE

(71) Applicant: SUMITOMO RUBBER INDUSTRIES, LTD., Kobe-shi, Hyogo (JP)

(72) Inventors: Kento Yamashita, Kobe (JP); Mitsuhiro Wada, Kobe (JP); Yusuke Maeda, Kobe (JP)

(73) Assignee: SUMITOMO RUBBER INDUSTRIES, LTD., Kobe-Shi, Hyogo (JP)

( * ) Notice: Subject to any disclaimer, the term of this patent is extended or adjusted under 35 U.S.C. 154(b) by 86 days.

(21) Appl. No.: 15/169,122

(22) Filed: May 31, 2016

(65) Prior Publication Data

US 2016/0347129 A1    Dec. 1, 2016

(30) Foreign Application Priority Data

Jun. 1, 2015    (JP) .................................. 2015-111602

(51) Int. Cl.
*B60C 23/00*    (2006.01)
*B60C 19/00*    (2006.01)
(Continued)

(52) U.S. Cl.
CPC .............. *B60C 23/00* (2013.01); *B60C 19/00* (2013.01); *B60C 23/062* (2013.01); *B60Q 9/00* (2013.01); *B60C 2019/004* (2013.01)

(58) Field of Classification Search
CPC ....... B60C 23/00; B60C 19/00; B60C 23/062; B60C 2019/004; B60Q 9/00
(Continued)

(56) References Cited

U.S. PATENT DOCUMENTS

2007/0139179 A1    6/2007    Yanase
2010/0013617 A1*   1/2010    Fujita .................... B60C 23/061
                                                        340/443
(Continued)

FOREIGN PATENT DOCUMENTS

JP    2008-110742 A    5/2008
JP    2011-247645 A    12/2011

*Primary Examiner* — Sujoy K Kundu
*Assistant Examiner* — Lynda Dinh
(74) *Attorney, Agent, or Firm* — Birch, Stewart, Kolasch & Birch, LLP

(57) ABSTRACT

Provided is a device for detecting a low-pressure state of a predetermined tire, comprising an index value calculation unit, a resonance frequency calculation unit and a low-pressure detection unit. The index value calculation unit calculates a low-pressure index value from wheel speed information of front and rear tires, the low-pressure index value being obtained by comparing rotation speeds of the front and rear tires. The resonance frequency calculation unit calculates a resonance frequency from wheel speed information of a tire. The low-pressure detection unit eliminates an influence of an imposed load on a vehicle and detects the low-pressure state of the predetermined tire based on: a predetermined parameter that indicates a linear relationship between the resonance frequency and the low-pressure index value under a low-pressure condition of the predetermined tire; the low-pressure index value thus calculated; and the resonance frequency thus calculated.

9 Claims, 16 Drawing Sheets

(51) Int. Cl.
  *B60Q 9/00*          (2006.01)
  *B60C 23/06*       (2006.01)
(58) Field of Classification Search
  USPC .......................................................... 702/138
  See application file for complete search history.

(56) References Cited

U.S. PATENT DOCUMENTS

2011/0288718 A1    11/2011  Wada
2012/0304754 A1*  12/2012  Oshiro .................. B60C 23/062
                                                                                     73/146

* cited by examiner

DEVICE FOR DETECTING LOW-PRESSURE STATE OF TIRE

CROSS REFERENCE TO RELATED APPLICATIONS

This application claims a priority to Japanese Patent Application No. 2015-111602 filed on Jun. 1, 2015, which is hereby incorporated by reference in its entirety.

FIELD OF INVENTION

The present invention relates to a detection device, a method, and a program for detecting a low-pressure state of one or more tires attached to a vehicle.

BACKGROUND

In order to drive a vehicle in comfort, it is important that the air pressure in the tires is adjusted. This is because the problem of degradation in ride quality and fuel consumption might occur if the air pressure drops below an appropriate value. Therefore, a system for automatically detecting low-pressure in the tires (TPMS: Tire Pressure Monitoring System) has been researched. Information indicating that the tires have low pressure can be used to warn the driver, for example.

Methods for detecting low-pressure in the tires include methods for indirectly evaluating low-pressure in the tires by using alternative index values as well as methods for directly measuring the air pressure in the tires by, for example, attaching a pressure sensor to the tires. A dynamic loaded radius (DLR) method and a resonance frequency method (RFM) are known as examples of such indirect evaluation methods. The DLR method takes advantage of the phenomenon in which a low-pressure tire has a reduced dynamic loaded radius due to being deformed while travelling, and accordingly has an increased rotation speed. With the DLR method, low pressure in a tire is estimated from the rotation speed of the tire. The RFM takes advantage of the phenomenon in which the frequency characteristics of the wheel speed vary due to a pressure decrease.

JP 2011-247645A (hereinafter referred to as Patent Literature 1) discloses a detection device employing the DLR method, and JP 2008-110742A (hereinafter referred to as Patent Literature 2) discloses a detection device employing a combination of the DLR method and the resonance frequency method. Patent Literatures 1 and 2 refer to three index values, namely DEL1 to DEL3, which are low-pressure index values for evaluating low-pressure in the case of the DLR method. In Patent Literature 2, DEL1 to DEL3 are defined as follows. Note that V1, V2, V3, and V4 respectively denote the wheel speed of the front left tire, the wheel speed of the front right tire, the wheel speed of the rear left tire, and the wheel speed of the rear right tire.

$$DEL1=[(V1+V4)/2-(V2+V3)/2]/[(V1+V2+V3+V4)/4]\times 100(\%)$$

$$DEL2=[(V1+V2)/2-(V3+V4)/2]/[(V1+V2+V3+V4)/4]\times 100(\%)$$

$$DEL3=[(V1+V3)/2-(V2+V4)/2]/[(V1+V2+V3+V4)/4]\times 100(\%)$$

SUMMARY OF INVENTION

As noted in Patent Literature 1, the rotation speed of a tire evaluated with the DLR method is affected by the imposed load on the vehicle as well as a decrease in the tire pressure. That is, if the imposed load is light, a low-pressure state might not be detected even though a pressure decrease has occurred in a tire, and conversely, if the imposed load is heavy, the low-pressure state might be detected even though no pressure decrease has occurred in a tire, for example. This phenomenon is particularly noticeable when DEL2, which is a comparison value obtained by comparing the rotation speeds of the front tires and the rotation speeds of the rear tires, is used as a low-pressure index value. The imposed load on a vehicle also affects the resonance frequency. Therefore, in the case of the resonance frequency method as well, the accuracy in detecting the low-pressure state might decrease due to variations in the imposed load. In particular, the degradation of the detection accuracy is noticeable when an attempt is made to detect the low-pressure state regarding the rear tires. As described above, for both the DLR method and the resonance frequency method, there is a demand for a method by which the influence of the imposed load can be eliminated and a low-pressure state can be more accurately detected.

An object of the present invention is to provide a detection device, a method, and a program that are capable of eliminating the influence of the imposed load on a vehicle and accurately detecting the low-pressure state of the tires.

A detection device according to a first aspect of the present invention is a detection device for detecting a low-pressure state of at least one predetermined tire out of a plurality of tires attached to a vehicle, and includes an index value calculation unit, a resonance frequency calculation unit, and a low-pressure detection unit. The index value calculation unit is configured to calculate a low-pressure index value from wheel speed information of a front tire and a rear tire out of the plurality of tires. The low-pressure index value is a comparison value obtained by comparing the rotation speed of the front tire and the rotation speed of the rear tire. The resonance frequency calculation unit is configured to calculate, from wheel speed information of at least one tire out of the plurality of tires, the resonance frequency of said at least one tire. The low-pressure detection unit is configured to eliminate an influence of an imposed load on the vehicle and detect the low-pressure state of said at least one predetermined tire based on: a predetermined parameter that indicates a linear relationship between the resonance frequency and the low-pressure index value under a low-pressure condition with respect to said at least one predetermined tire; the low-pressure index value calculated by the index value calculation unit; and the resonance frequency calculated by the resonance frequency calculation unit.

A detection device according to a second aspect of the present invention is the detection device according to the first aspect, and said at least one predetermined tire is two front tires or two rear tires.

A detection device according to a third aspect of the present invention is the detection device according to the first aspect or the second aspect, and the low-pressure detection unit is configured to correct the low-pressure index value calculated by the index value calculation unit so as to eliminate the influence of the imposed load, based on the parameter and the resonance frequency calculated by the resonance frequency calculation unit, and to detect the low-pressure state of said at least one predetermined tire by using the low-pressure index value thus corrected and a predetermined threshold value.

A detection device according to a fourth aspect of the present invention is the detection device according to the first aspect or the second aspect, and the low-pressure detection unit is configured to correct a predetermined threshold value so as to eliminate the influence of the imposed load, based on the parameter and the resonance frequency calculated by the resonance frequency calculation unit, and to detect the low-pressure state of said at least one predetermined tire by using the low-pressure index value calculated by the index value calculation unit and the threshold value thus corrected.

A detection device according to a fifth aspect of the present invention is the detection device according to the first aspect, and said at least one predetermined tire is four tires that include two front tires and two rear tires.

A detection device according to a sixth aspect of the present invention is the detection device according to the first aspect, the second aspect, or the fifth aspect, and the low-pressure detection unit is configured to correct the resonance frequency calculated by the resonance frequency calculation unit so as to eliminate the influence of the imposed load, based on the parameter and the low-pressure index value calculated by the index value calculation unit, and to detect the low-pressure state of said at least one predetermined tire by using the resonance frequency thus corrected and a predetermined threshold value.

A detection device according to a seventh aspect of the present invention is the detection device according to the first aspect, the second aspect, or the fifth aspect, and the low-pressure detection unit is configured to correct a predetermined threshold value so as to eliminate the influence of the imposed load, based on the parameter and the low-pressure index value calculated by the index value calculation unit, and to detect the low-pressure state of said at least one predetermined tire by using the resonance frequency calculated by the resonance frequency calculation unit and the threshold value thus corrected.

A detection device according to an eighth aspect of the present invention is the detection device according to the first aspect, the second aspect, or the fifth aspect, and the parameter specifies a low-pressure area within a space defined by the resonance frequency and the low-pressure index value taken as axes. The low-pressure area corresponds to the low-pressure state of said at least one predetermined tire. The low-pressure detection unit is configured to detect the low-pressure state of said at least one predetermined tire if a point that is specified by the low-pressure index value calculated by the index value calculation unit and the resonance frequency calculated by the resonance frequency calculation unit belongs to the low-pressure area.

A detection device according to a ninth aspect of the present invention is the detection device according to any of the first aspect to the eight aspect, and further includes a low-pressure warning unit. The low-pressure warning unit is configured to generate a low-pressure warning upon detecting the low-pressure state of said at least one predetermined tire.

A detection method according to a tenth aspect of the present invention is a detection method for detecting a low-pressure state of at least one predetermined tire out of a plurality of tires attached to a vehicle, and includes the following steps.

(1) The step of calculating a low-pressure index value from wheel speed information of a front tire and a rear tire out of the plurality of tires, the low-pressure index value being a comparison value obtained by comparing a rotation speed of the front tire and a rotation speed of the rear tire.

(2) The step of calculating, from wheel speed information of at least one tire out of the plurality of tires, a resonance frequency of said at least one tire.

(3) The step of detecting the low-pressure state of said at least one predetermined tire based on: a predetermined parameter that indicates a linear relationship between the resonance frequency and the low-pressure index value under a low-pressure condition with respect to said at least one predetermined tire; the low-pressure index thus calculated; and the resonance frequency thus calculated, while eliminating an influence of an imposed load on the vehicle.

A non-transitory computer readable medium according to an eleventh aspect of the present invention is a non-transitory computer readable medium storing a detection program for detecting a low-pressure state of at least one predetermined tire out of a plurality of tires attached to a vehicle. The detection program causes a computer to perform the following steps.

(1) The step of calculating a low-pressure index value from wheel speed information of a front tire and a rear tire out of the plurality of tires, the low-pressure index value being a comparison value obtained by comparing a rotation speed of the front tire and a rotation speed of the rear tire.

(2) The step of calculating, from wheel speed information of at least one tire out of the plurality of tires, a resonance frequency of said at least one tire.

(3) The step of detecting the low-pressure state of said at least one predetermined tire based on: a predetermined parameter that indicates a linear relationship between the resonance frequency and the low-pressure index value under a low-pressure condition with respect to said at least one predetermined tire; the low-pressure index thus calculated; and the resonance frequency thus calculated, while eliminating an influence of an imposed load on the vehicle.

According to one aspect of the present invention, in order to detect a low-pressure state of a predetermined tire, a low-pressure index value and a resonance frequency are calculated from wheel speed information during driving. The low-pressure index value mentioned above is a comparison value obtained by comparing the rotation speed of a front tire and the rotation speed of a rear tire, such as DEL2 described above. The low-pressure index value and the resonance frequency each change depending on the imposed load, and if the tire pressure decrease status is the same, the low-pressure index value and the resonance frequency have an approximately constant linear relationship. This linear relationship is approximately constant regardless of the imposed load. Based on this principle, according to one aspect of the present invention, a parameter that indicates a linear relationship between the resonance frequency and the low-pressure index value under a low-pressure condition with respect to a predetermined tire has been determined in advance. Whether or not the predetermined tire is in the low-pressure state is determined based on the parameter and the low-pressure index value and the resonance frequency during travelling. Thus, it is possible to correctly detect the low-pressure state of the tire while cancelling the influence of the imposed load on the vehicle.

DETAILED DESCRIPTION OF THE PREFERRED EMBODIMENTS

The following describes a detection device, a method, and a program for detecting a low-pressure state in a tire according to an embodiment of the present invention with reference to drawings.

1. Configuration of Detection Device

Figure 1:
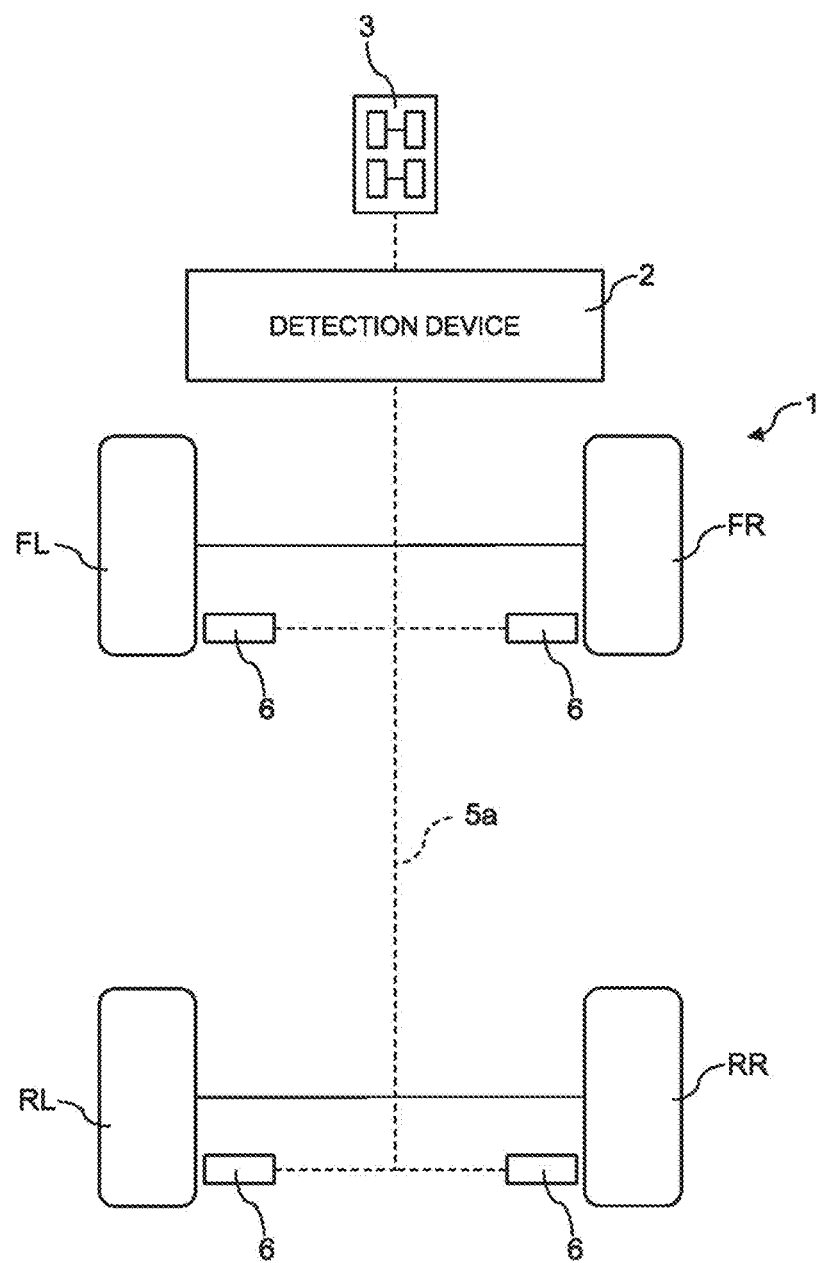
FIG. 1 is a schematic diagram showing a situation in which a detection device according to an embodiment of the present invention is mounted on a vehicle.

FIG. 1 is a schematic diagram showing a situation in which a detection device 2 according to the present embodiment is mounted on a vehicle 1. The vehicle 1 is a four-wheel vehicle, and has a front left tire FL, a front right tire FR, a rear left tire RL, and a rear right tire RR. The detection device 2 has the function of detecting the low-pressure state of the tires FL, FR, RL, and RR, and upon detecting the low-pressure state of the tires FL, FR, RL, and RR, issues a warning indicating the low-pressure state, via a warning indicator 3 that is mounted on the vehicle 1. The details of the low-pressure detection processing are described below.

In the present embodiment, the low-pressure state of the tires FL, FR, RL, and RR is detected based on their wheel speeds (rotation speeds). A wheel speed sensor 6 is attached to each of the tires FL, FR, RL, and RR (more accurately, each of the wheels to which the tires FL, FR, RL, and RR are attached), and each wheel speed sensor 6 detects wheel speed information of the tire to which the wheel speed sensor 6 is attached. Each wheel speed sensor 6 is connected to the detection device 2 via a communication line 5a, and the wheel speed information detected by each wheel speed sensor 6 is transmitted to the detection device 2 in real time.

Any kinds of sensor may be used as the wheel speed sensors 6 insofar as they can detect the wheel speeds of the tires FL, FR, RL, and RR during driving. For example, a sensor that measures the wheel speed based on an output signal from an electromagnetic pickup, or a sensor that generates power by using rotation as with a dynamo and measures the wheel speed based on the generated voltage may be used. The positions to which the wheel speed sensors 6 are attached are not particularly limited, and may be selected depending on the sensor type as needed, insofar as they can detect the wheel speeds.

Figure 2:
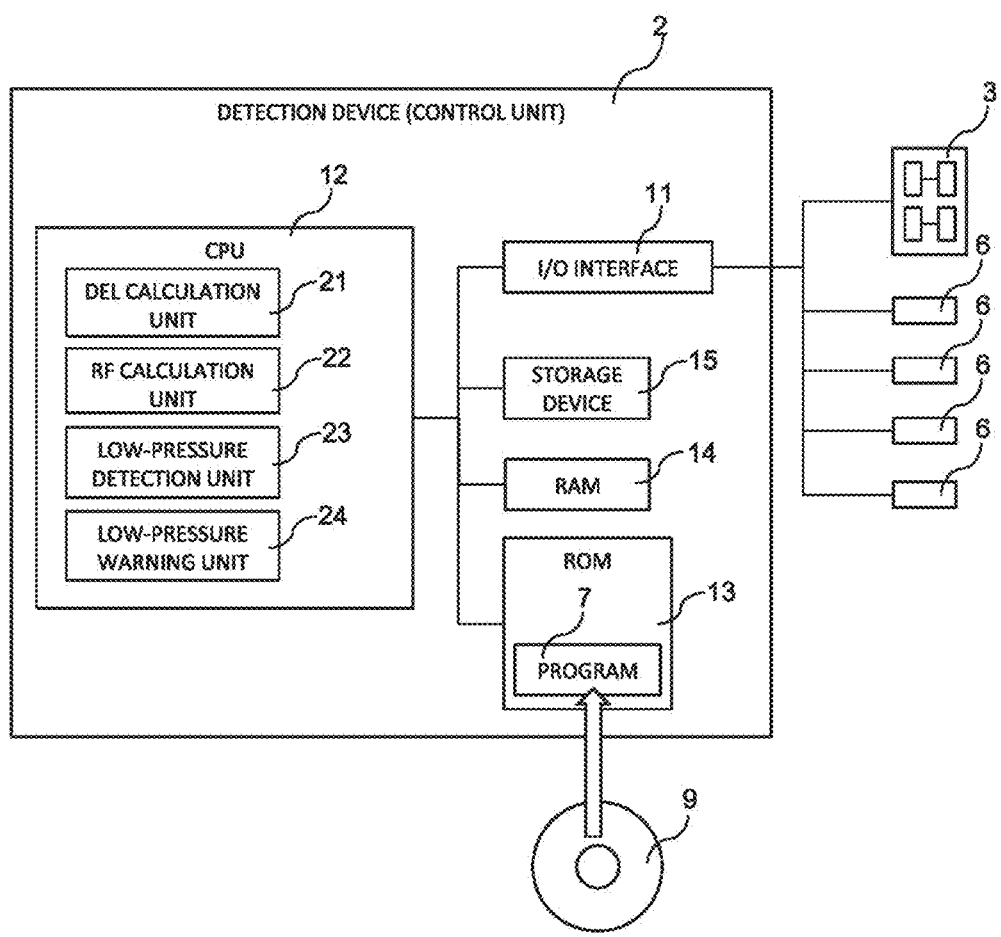
FIG. 2 is a block diagram showing an electrical configuration of the detection device.

FIG. 2 is a block diagram showing an electrical configuration of the detection device 2. As shown in FIG. 2, the detection device 2 is a control unit mounted on the vehicle 1, and includes an I/O interface 11, a CPU 12, a ROM 13, a RAM 14, and a non-volatile rewritable storage device 15. The I/O interface 11 is a communication device for communication with external devices such as the wheel speed sensors 6 and the warning indicator 3. The ROM 13 stores therein a program 7 for controlling each unit of the vehicle 1. The program 7 is written to the ROM 13 from a storage medium 9 such as a CD-ROM. The CPU 12 virtually operates as a DEL calculation unit 21, an RF calculation unit 22, a low-pressure detection unit 23, and a low-pressure warning unit 24 by reading out the program 7 from the ROM 13 and executing the same. The details of operations performed by the units 21 to 24 are described below. The storage device 15 is configured with a hard disk, a flash memory, or the like. Note that the program 7 may be stored in the storage device 15 instead of the ROM 13. The RAM 14 and the storage device 15 are used for calculation by the CPU 12 as needed.

The warning indicator 3 may be realized in any manner insofar as it can notify the user of the occurrence of a pressure decrease, with a liquid crystal display element, a liquid crystal monitor, or the like. For example, the warning indicator 3 may be realized with four lamps that respectively correspond to the four tires FL, FR, RL, and RR, and that are provided in the same arrangement as the actual arrangement of the tires. The position to which the warning indicator 3 is attached can be selected as needed. However, it is preferable that the warning indicator 3 is provided at a position that is easy for the driver to see, such as a position on the instrument panel. If the control unit (detection device 2) is connected to a car navigation system, the monitor for the car navigation system may be used as the warning indicator 3. When a monitor is used as the warning indicator 3, the warning may be represented as an icon or text information displayed on the monitor.

2. Low-Pressure Detection Processing

Figure 3:
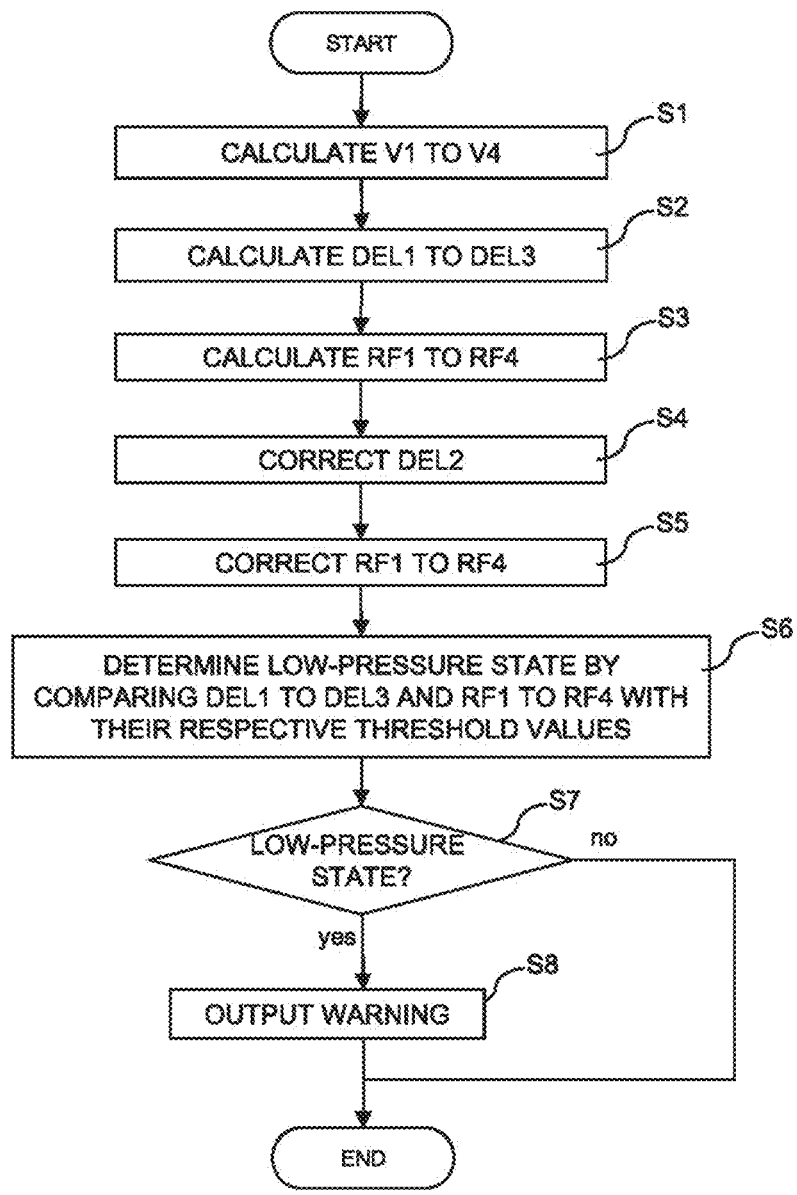
FIG. 3 is a flowchart showing low-pressure detection processing.

The following describes low-pressure detection processing for detecting the low-pressure states of the tires FL, FR, RL, and RR with reference to FIG. 3. The low-pressure detection processing shown in FIG. 3 employs the combination of the dynamic loaded radius (DLR) method and the resonance frequency method (RFM). The low-pressure detection processing is repeatedly performed at predetermined points in time (e.g., once every ten minutes) while the electrical system in the vehicle 1 is supplied with power. With the low-pressure detection processing according to the present embodiment, low-pressure tires are specified from among the four tires FL, FR, RL, and RR. More specifically, low-pressure tires can be detected based on the following fifteen combinations.

(1) Only FL has low pressure.
(2) Only FR has low pressure.
(3) Only RL has low pressure.
(4) Only RR has low pressure.
(5) Only FL and FR have low pressure.
(6) Only FL and RL have low pressure.
(7) Only FL and RR have low pressure.
(8) Only FR and RL have low pressure.
(9) Only FR and RR have low pressure.
(10) Only RL and RR have low pressure.
(11) Only FL, FR, and RL have low pressure.
(12) Only FL, FR, and RR have low pressure.
(13) Only FL, RL, and RR have low pressure.
(14) Only FR, RL, and RR have low pressure.
(15) FL, FR, RL, and RR all have low pressure.

First, in step S1, the DEL calculation unit 21 calculates V1 to V4. V1, V2, V3, and V4 denote the wheel speed (the rotation speed) of the tire FL, the wheel speed of the tire FR, the wheel speed of the tire RL, and the wheel speed of the tire RR, respectively. The DEL calculation unit 21 receives output signals from each of the wheel speed sensors 6 during a predetermined sampling period $\Delta T$, and converts the received signals into the wheel speeds V1 to V4.

In the subsequent step S2, the DEL calculation unit 21 calculates low-pressure index values DEL1 to DEL3, which are used for determining the low-pressure states of the tires. DEL1, DEL2, and DEL3 are index values respectively having the following properties.

DEL1: An index value that increases as the wheel speeds V1 and V4 increase and decreases as the wheel speeds V2 and V3 increase, or an index value that increases as the wheel speeds V2 and V3 increase and decreases as the wheel speeds V1 and V4 increase.

DEL2: An index value that increases as the wheel speeds V1 and V2 increase and decreases as the wheel speeds V3 and V4 increase, or an index value that increases as the wheel speeds V3 and V4 increase and decreases as the wheel speeds V1 and V2 increase.

DEL3: An index value that increases as the wheel speeds V1 and V3 increase and decreases as the wheel speeds V2 and V4 increase, or an index value that increases as the wheel speeds V2 and V4 increase and decreases as the wheel speeds V1 and V3 increase.

Note that if the pressures in the tires FL, FR, RL, and RR further decrease, their respective dynamic loaded radii decrease, and accordingly their respective wheel speeds V1 to V4 increase and the low-pressure index values DEL1 to DEL3 change. In the low-pressure detection processing according to the present embodiment, changes in the low-pressure index values DEL1 to DEL3 from their respective reference values are detected in step S6 described below, and thus the low-pressure states of the tires are detected.

DEL1 to DEL3 can be defined in various manners insofar as they have the above-described properties. In the present embodiment, DEL1 to DEL3 are calculated according to the following formulas.

$$DEL1 = [(V1+V4)/(V2+V3)-1] \times 100(\%)$$

$$DEL2 = [(V1+V2)/(V3+V4)-1] \times 100(\%)$$

$$DEL3 = [(V1+V3)/(V2+V4)-1] \times 100(\%)$$

In another embodiment, DEL1 to DEL3 may be defined as follows as described in "Background Art".

$$DEL1 = [[(V1+V4)/2-(V2+V3)/2]/(V1+V2+V3+V4)] \times 100(\%)$$

$$DEL2 = [[(V1+V2)/2-(V3+V4)/2]/(V1+V2+V3+V4)] \times 100(\%)$$

$$DEL3 = [[(V1+V3)/2-(V2+V4)/2]/(V1+V2+V3+V4)] \times 100(\%)$$

Alternatively, DEL1, DEL2, and DEL3 may be defined as follows.

$$DEL1 = (V1 \times V4)/(V2 \times V3)$$

$$DEL2 = (V1 \times V2)/(V3 \times V4)$$

$$DEL3 = (V1 \times V3)/(V2 \times V4)$$

Alternatively, DEL1, DEL2, and DEL3 may be defined as follows.

$$DEL1 = (V1^2+V4^2)-(V2^2+V3^2)$$

$$DEL2 = (V1^2+V2^2)-(V3^2+V4^2)$$

$$DEL3 = (V1^2+V3^2)-(V2^2+V4^2)$$

As described above, DEL1 is an index value that increases as the wheel speeds of two tires located in one diagonal line out of the four tires increase, and decreases as the wheel speeds of the two tires located in the other diagonal line out of the four tires increase. DEL3 is an index value that increases as the wheel speeds of two tires on the left side or the right side out of the four tires increase, and decreases as the wheel speeds of the remaining two tires out of the four tires increase. DEL2 is an index value that increases as the wheel speeds of the two front tires or the two rear tires out of the four tires increase, and decreases as the wheel speeds of the remaining two tires out of the four tires increase. Usually, the imposed load on the vehicle 1 increases due to luggage loaded in the trunk, passengers in the rear seat, or the like, and such an increase greatly affects the dynamic loaded radii of the two rear tires. Consequently, both V3 and V4 increase, and both V1 and V2 become relatively small. Thus, DEL1 and DEL3 are index values that are unlikely to be affected by the imposed load, whereas DEL2 is an index value that is likely to be affected by the imposed load. For this reason, in step S4 described below, correction for eliminating the influence of the imposed load is performed only for DEL2.

Next, in step S3, the RF calculation unit 22 calculates RF1 to RF4. RF1, RF2, RF3, and RF4 respectively denote the resonance frequency of the tire FL, the resonance frequency of the tire FR, the resonance frequency of the tire RL, and the resonance frequency of the tire RR.

While the vehicle 1 is travelling on a road, forces such as torsional moment applied about the axle of a tire, up-down forces, front-rear forces, and left-right forces are generated due to forces applied from small projections and depressions of the road, and thus resonance occurs in each of the tires FL, FR, RL and RR. Also, when the air pressure in a tire decreases, the spring constant of the side wall part of the tire changes. Thus, the resonance frequencies RF1 to RF4 change. In the low-pressure detection processing according to the present embodiment, changes in the resonance frequencies RF1 to RF4 from their respective reference values are detected in step S6 described below, and thus the low-pressure states of the tires are detected.

The RF calculation unit 22 extracts frequency components from the waveform signals corresponding to the wheel speeds V1 to V4. More specifically, the RF calculation unit 22 performs frequency analysis on each of the waveform signals respectively corresponding to the wheel speeds V1 to V4 by using fast Fourier transform (FFT) for example, derives a power spectrum from each of the waveform signals, and specifies the resonance frequencies RF1 to RF4. Note that since the power spectrum contains noise received from the road surface, it is desirable to take an average of a predetermined number of calculation results. For example, a power spectrum is obtained multiple times, and the average gain value is calculated for each frequency component. The frequency corresponding to the peak of the average gain values can be specified as the corresponding resonance frequency among the resonance frequencies RF1 to RF4.

Through Steps S1 to S3 described above, the low-pressure index values DEL1 to DEL3 and the resonance frequencies RF1 to RF4 are calculated while the vehicle 1 is travelling, and a low-pressure state can be detected by making a comparison between these values and their respective threshold values. However, the low-pressure index value DEL2 and the resonance frequencies RF1 to RF4 might greatly depend on not only the air pressure states of the tires FL, FR, RL, and RR but also on the imposed load on the vehicle 1. Consequently, if the threshold values to be compared with these values are set in a situation where the imposed load is light, misdetection might occur in a situation where the imposed load is heavy. The opposite is equally true. The subsequent steps S4 and S5 are the steps of correcting the low-pressure index value DEL2 and the resonance frequencies RF1 to RF4 calculated through steps S2 and S3, in order to avoid such misdetection and improve the accuracy of the low-pressure determination.

In step S4, the low-pressure detection unit 23 corrects DEL2 calculated in step S2 so as to eliminate the influence of the imposed load from DEL2. This correction is made based on the principle that DEL2 and the resonance frequencies RF1 to RF4 are each a parameter that changes depending on the imposed load, and if the tire pressure decrease status is the same, DEL2 and the resonance frequencies RF1 to RF4 will have an approximately constant linear relationship regardless of the imposed load.

Figure 4A:
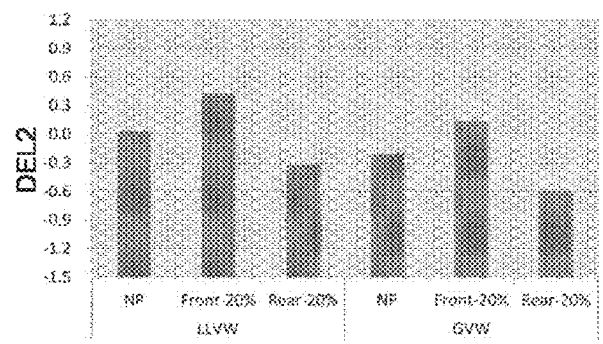
FIG. 4A is a graph showing the value of DEL2 in a normal case, a case where two front tires have low pressure, and a case where two rear tires have low pressure, under different load conditions.
Figure 4B:
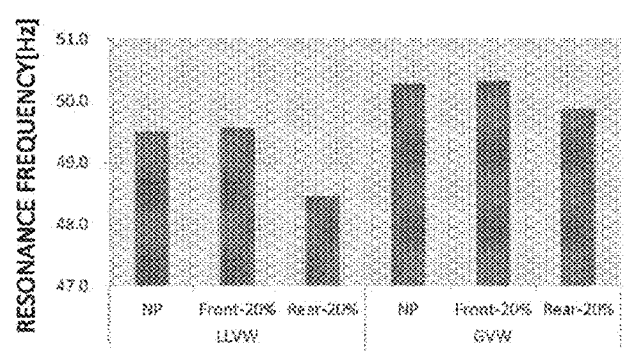
FIG. 4B is a graph showing the value of a resonance frequency in a normal case, a case where the two front tires have low pressure, and a case where the two rear tires have low pressure, under different load conditions.

The following provides further details of the principle of the correction in step S4 based on the actual measurement data shown in FIGS. 4A and 4B, FIGS. 5A and 5B, FIGS. 7A and 7B, and FIGS. 8A and 8B. FIG. 4A is a bar graph showing values of DEL2 in a light imposed load state (light load state: LLVW) and a heavy imposed load state (rated load state: GVW) under each of the following conditions: the condition where all of the tires FL, FR, RL, and RR have normal (100%) air pressure (NP condition); the condition where only the front tires FL and FR have a pressure decrease of 20% (Front −20% condition); and the condition where only the rear tires RL and RR have a pressure decrease of 20% (Rear −20% condition). FIG. 4B is a bar graph showing values of a resonance frequency under the same conditions. Note that the resonance frequency contained in the data shown in FIG. 4B, FIGS. 5A and 5B, and FIGS. 7A and 7B is the resonance frequency of the rear left tire. Also note that the data shown in FIGS. 4A and 4B, FIGS. 5A and 5B, FIGS. 7A and 7B, and FIGS. 8A and 8B show data measured while a rear wheel drive, four-wheel vehicle with a front engine (an in-line four-cylinder gasoline engine) is travelling at 80 km/h.

It can be seen from FIGS. 4A and 4B that the value of DEL2 decreases as the imposed load increases, increases as the pressure in the front tires FL and FR decreases, and decreases as the pressure in the rear tires RL and RR decreases. It can also be seen that the resonance frequency increases as the imposed load increases, is independent of a pressure decrease in the front tires FL and FR, and decreases as the pressure in the rear tires RL and RR decreases.

Figure 5A:
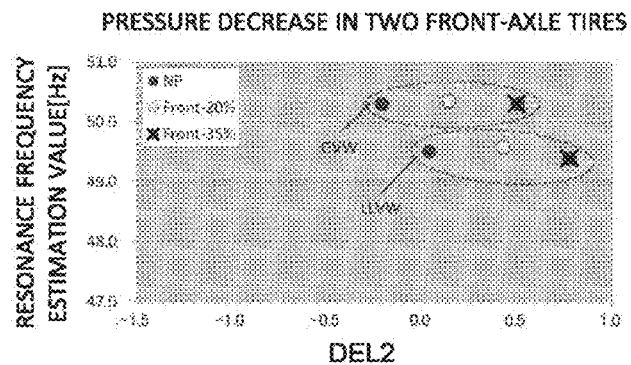
FIG. 5A is a graph showing the value of DEL2 and the value of a resonance frequency in a case where the two front tires have low pressure, under different pressure decrease progression conditions.
Figure 5B:
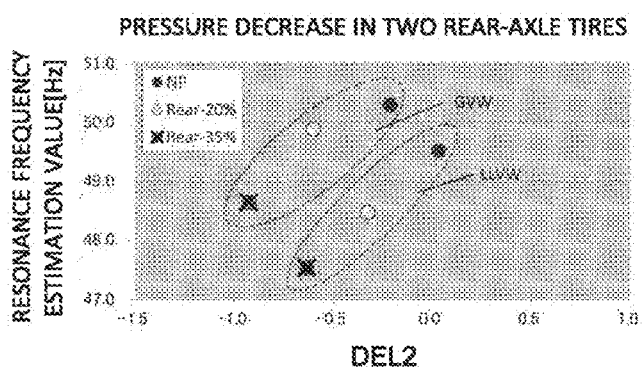
FIG. 5B is a graph showing the value of DEL2 and the value of a resonance frequency in a case where the two rear tires have low pressure, under different pressure decrease progression conditions.

FIGS. 5A and 5B are graphs by which the data shown in FIGS. 4A and 4B is plotted on a DEL2-resonance frequency space with DEL2 and the resonance frequency taken as the axes. In FIGS. 5A and 5B, in order to clarify the tendency described below, data in the light load state LLVW and the rated load state GVW under each of the following conditions is also plotted: the condition where only the front tires FL and FR have a pressure decrease of 35% (Front −35%); and the condition where only the rear tires RL and RR have a pressure decrease of 35% (Rear −35%).

It can be seen from FIGS. 5A and 5B that DEL2 and the resonance frequency regress to different straight lines (lines resulting from linear approximation) depending on the pressure decrease progression status, and these regression lines can be approximately parallel if the combination of low-pressure tires is the same (in the example shown in FIGS. 5A and 5B, only the two front tires or only the two rear tires).

Based on this tendency, it is possible to eliminate the influence of the imposed load from DEL2 during driving by substituting a resonance frequency RF (e.g., the resonance frequency RF3 of the rear left tire RL) during driving into the following formula. In the following formula, DEL2' denotes DEL2 after correction, and "a" denotes a predetermined coefficient. $RF_0$ denotes the resonance frequency measured under a reference pressure decrease progression condition (which may be the NP condition) and a reference imposed load condition.

$$DEL2'=DEL2-a\times(RF-RF_0)$$

Based on the principle above, the low-pressure detection unit 23 calculates DEL2' as a value corrected from DEL2 calculated in step S2, according to the formula above. DEL2' denotes DEL2 under the reference imposed load condition. Therefore, with a threshold value for low-pressure determination determined in advance under the reference imposed load condition, accurate low-pressure determination can be performed by making a comparison between the DEL2' and the threshold value, regardless of the magnitude of the imposed load. Various methods can be conceived of as methods for setting the threshold value. For example, it is possible to calculate the value of DEL2 in advance under the reference imposed load condition and a pressure decrease progression condition for issuing a low-pressure warning (e.g., the condition where the two front tires have a pressure decrease of 20% if a low-pressure warning is to be issued when a pressure decrease of 20% occurs in the two front tires), and to store the value in the storage device 15 as the threshold value for low-pressure determination. Alternatively, it is possible to calculate the value of DEL2 in advance under the reference imposed load condition and the NP condition, and to store the value in the storage device 15 as the reference value for low-pressure determination. In the case of the latter example, the storage device 15 stores in advance, in addition to the value of DEL2 under the NP condition, a threshold value that determines how much change in DEL2 from the aforementioned value of DEL2 during travel triggers a low-pressure warning, for example.

The coefficient "a" in the formula above represents the amount of change (a decrease) in DEL2 corresponding to the amount of change (an increase) in the resonance frequency RF. This value is determined for each combination of low-pressure tires to be detected (including the cases of a single tire). In the present embodiment, DEL2' is used for detecting a pressure decrease in only the two front tires or a pressure decrease in only the two rear tires as described below. Therefore, two types of values, one for detecting a pressure decrease in only the two front tires, and the other for detecting a pressure decrease in only the two rear tires, have been calculated in advance for the coefficient "a", and are stored in the storage device 15. The same applies to $RF_0$. The coefficient "a" can be set by various methods. For example, "a" can be determined by: collecting the data of DEL2 and the resonance frequencies RF under various pressure decrease progression conditions and various imposed load conditions; deriving a regression line of the data for each of the pressure decrease progression conditions; and taking the average of the inclinations of the regression lines corresponding to the various pressure decrease progression conditions.

As described above, the coefficient "a" has two types of values, one for detecting low pressure in only the two front tires, and the other for detecting low pressure in only the two rear tires. Therefore, for DEL2' as well, two types of values, one for detecting low pressure in only the two front tires, and the other for detecting low pressure in only the two rear tires, are calculated in step S4.

Figure 6:
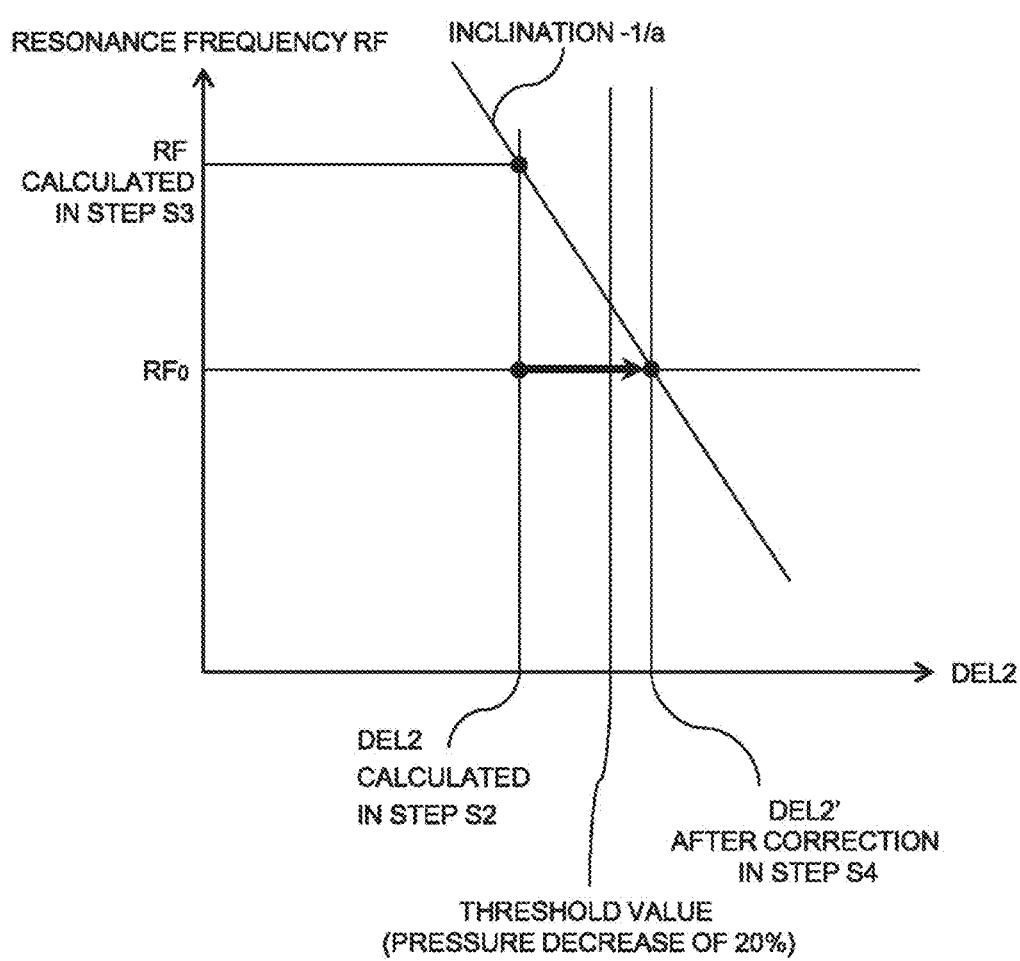
FIG. 6 is a diagram illustrating a principle of DEL2 correction.
Figure 7A:
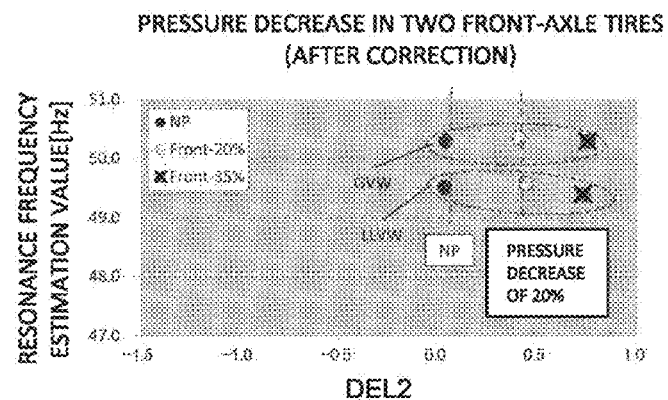
FIG. 7A is a graph showing the value of DEL2 after correction in a case where the two front tires have low pressure, under different pressure decrease progression conditions.
Figure 7B:
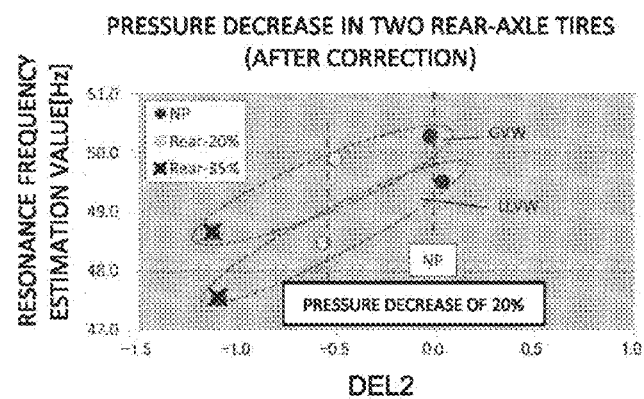
FIG. 7B is a graph showing the value of DEL2 after correction in a case where the two rear tires have low pressure, under different pressure decrease progression conditions.

FIG. 6 is a diagram illustrating the principle and the effects of this correction. In the example shown in this drawing, in the case where DEL2 calculated in step S2 is not corrected, the value of DEL2 does not exceed the threshold value, and no pressure decrease is detected. However, due to the correction in step S4, the influence of the imposed load is taken into consideration. That is, DEL2 is corrected to DEL2', DEL2' exceeds the threshold value, and thus a pressure decrease can be correctly detected. FIGS. 7A and 7B show data indicating the results of actually correcting the values of DEL2 shown in FIGS. 5A and 5B to values of DEL2' by using the above-described method. It can be seen that each value of DEL2' in the light load state LLVW and its corresponding value of DEL2' in the rated load state GVW under the same pressure decrease progression condition have a smaller difference in FIGS. 7A and 7B than in FIGS. 5A and 5B. Thus, it can be seen from FIGS. 7A and 7B that this correction can eliminate the influence of the imposed load.

Figure 8A:
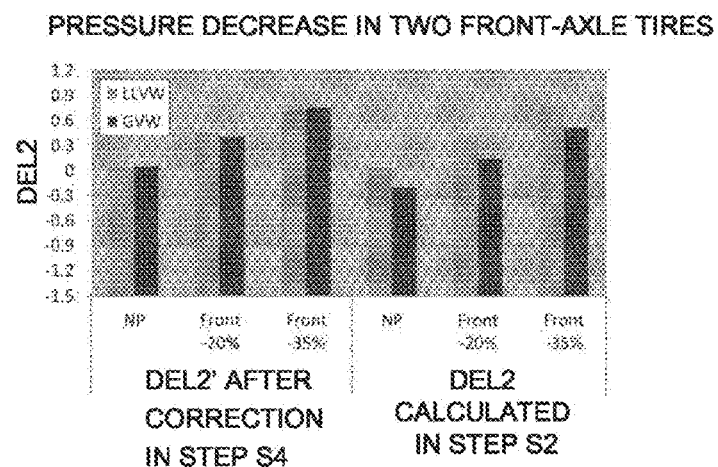
FIG. 8A is a graph showing the value of DEL2 before and after correction in a case where the two front tires have low pressure, under different pressure decrease progression conditions.
Figure 8B:
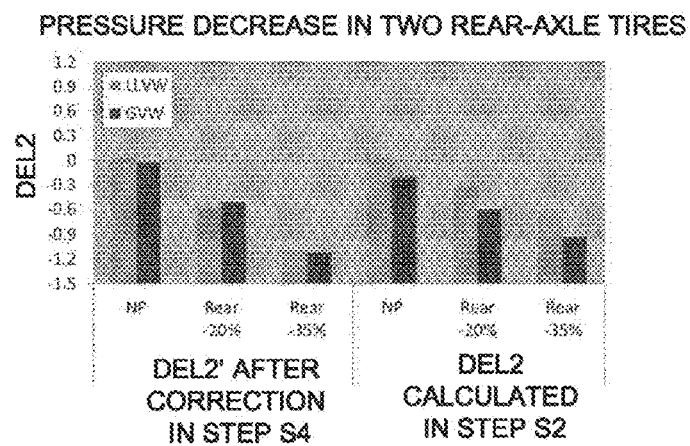
FIG. 8B is a graph showing the value of DEL2 before and after correction in a case where the two rear tires have low pressure, under different pressure decrease progression conditions.

FIGS. 8A and 8B also show data indicating actual test results. FIG. 8A is a graph in which values of DEL2 calculated in step S2 in the light load state LLVW and the rated load state GVW are compared with their corresponding values after the correction in step S4, under each of the following conditions: the NP condition; the condition where only the front tires FL and FR have a pressure decrease of 20% (Front −20% condition); and the condition where only the front tires FL and FR have a pressure decrease of 35% (Front −35% condition). Similarly, FIG. 8B is a graph in which values of DEL2 calculated in step S2 in the light load state and the rated load state are compared with their corresponding values after the correction in step S4, under each of the following conditions: the NP condition; the condition where only the rear tires RL and RR have a pressure decrease of 20% (Rear −20% condition); and the condition where only the rear tires RL and RR have a pressure decrease of 35% (Rear −35% condition).

It can be seen from FIGS. 8A and 8B that values of DEL2 under different imposed load conditions have a smaller difference after the correction in step S4 than those before the correction. Thus, it can be seen from FIGS. 8A and 8B as well that the correction in step S4 can eliminate the influence of the imposed load.

In the subsequent step S5, the low-pressure detection unit 23 corrects RF1 to RF4 calculated in step S3 so as to eliminate the influence of the imposed load from RF1 to RF4. As with step S4, this correction is made on the principle that if the tire pressure decrease status is the same, DEL2 and the resonance frequencies RF1 to RF4 will have an approximately constant linear relationship regardless of the imposed load.

Figure 9A:
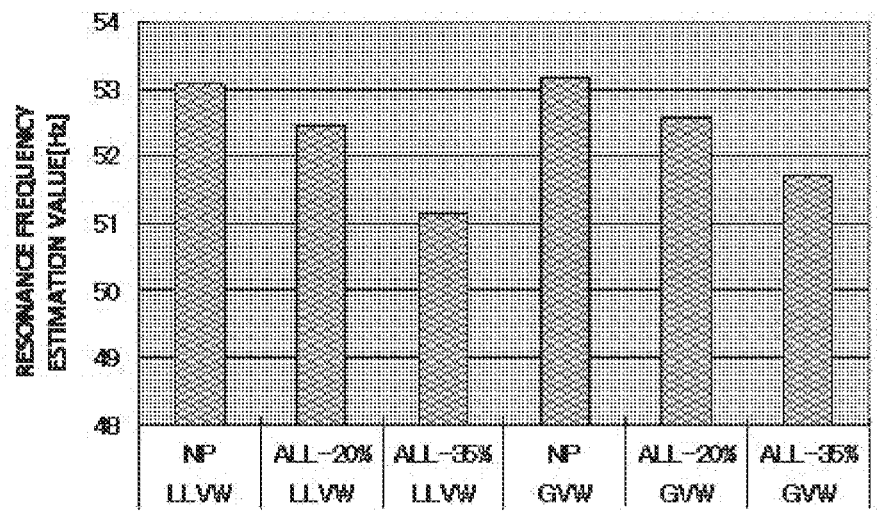
FIG. 9A is a graph showing the value of a resonance frequency in a normal case and a case where four tires have low pressure, under different load conditions.
Figure 9B:
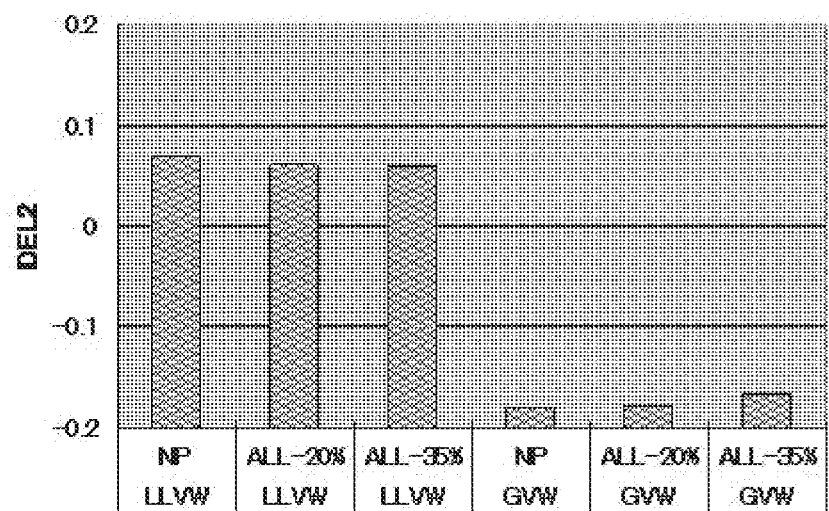
FIG. 9B is a graph showing the value of DEL2 in a normal case and a case where the four tires have low pressure, under different load conditions.
Figure 10:
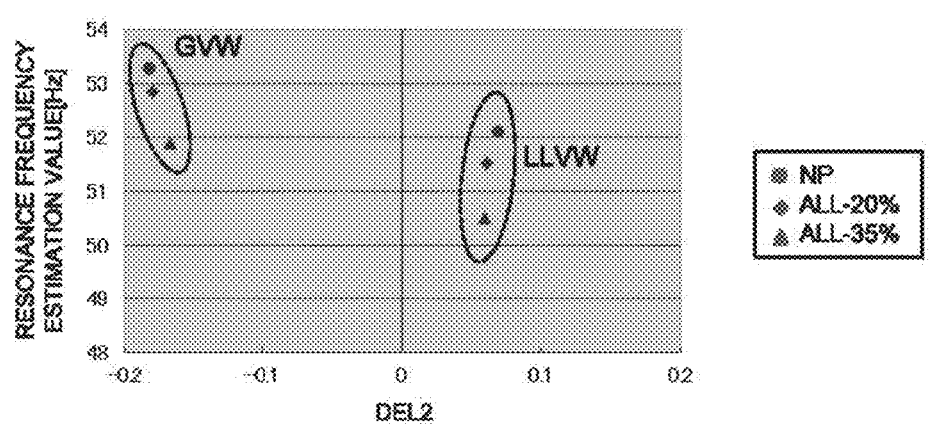
FIG. 10 is a graph showing the value of DEL2 and the value of a resonance frequency in a case where the four tires have low pressure, under different pressure decrease progression conditions.
Figure 12:
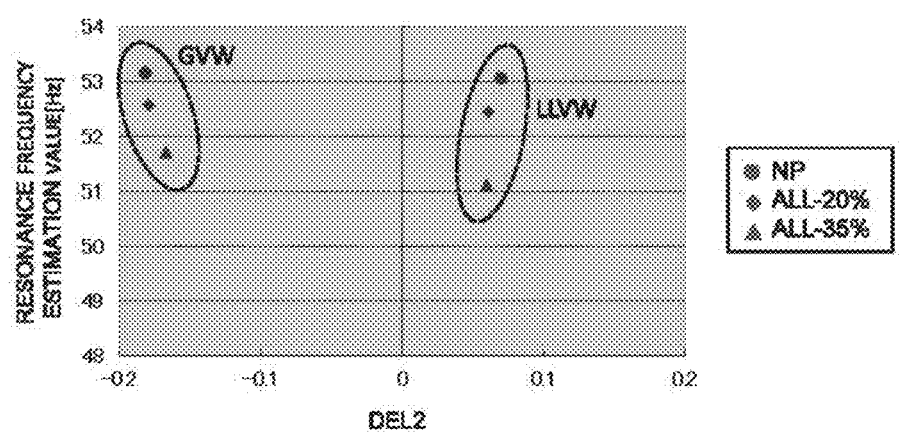
FIG. 12 is a graph showing the value of a resonance frequency after correction in a case where the four tires have low pressure, under different pressure decrease progression conditions.

The following provides further details of the principle of the correction in step S5 based on the actual measurement data shown in FIGS. 9A and 9B, FIG. 10, and FIG. 12. FIG. 9A is a bar graph showing values of a resonance frequency in the light imposed load state (light load state: LLVW) and the heavy imposed load state (rated load state: GVW) under each of the following conditions: the condition where all of the four tires FL, FR, RL, and RR have normal (100%) air pressure (NP condition); the condition where all of the four tires FL, FR, RL, and RR have a pressure decrease of 20% (ALL −20% condition); and the condition where all of the four tires FL, FR, RL, and RR have a pressure decrease of 35% (All −35% condition). FIG. 9B is a bar graph showing values of DEL2 under the same conditions. Note that the resonance frequency contained in the data shown in FIG. 9A, FIG. 10, and FIG. 12 is the resonance frequency of the rear left tire. Also note that the data shown in FIGS. 9A and 9B, FIG. 10, and FIG. 12 is data measured while a rear wheel drive, four-wheel vehicle with a front engine (an in-line four-cylinder gasoline engine) is travelling at 60 km/h.

It can be seen from FIGS. 9A and 9B that the resonance frequency decreases as the imposed load increases, and decreases as the pressure in all four tires decreases. It can also be seen that the value of DEL2 decreases as the imposed load increases, but is independent of the progression of the pressure decrease in all four tires.

FIG. 10 is a graph in which the data shown in FIGS. 9A and 9B is plotted on a DEL2-resonance frequency space with DEL2 and the resonance frequency taken as the axes. It can be seen from FIG. 10 that DEL2 and the resonance frequency regress to different straight lines (lines resulting from linear approximation) depending on the progression status of the pressure decrease, and these regression lines can be approximately parallel if a pressure decrease has occurred in the same combination of tires (in the example shown in FIG. 10, all four tires).

Based on this tendency, it is possible to eliminate the influence of the imposed load from the resonance frequencies RF1 to RF4 during travel, by substituting DEL2 during travel into the following formula. In the following formula, RF1' to RF4' respectively denote RF1 to RF4 after correction, and coefficients "b" (b1 to b4) have been determined in advance. $DEL2_0$ denotes DEL2 measured under a reference pressure decrease progression condition (which may be the NP condition) and a reference imposed load condition.

$$RF1'=RF1-b1\times(DEL2-DEL2_0)$$

$$RF2'=RF2-b2\times(DEL2-DEL2_0)$$

$$RF3'=RF3-b3\times(DEL2-DEL2_0)$$

$$RF4'=RF4-b4\times(DEL2-DEL2_0)$$

Based on the principle above, the low-pressure detection unit 23 calculates RF1' to RF4' as values corrected from the resonance frequencies RF1 to RF4 calculated in step S3, according to the formula above. RF1' to RF4' respectively denote the resonance frequencies RF1 to RF4 under the reference imposed load condition. Therefore, with threshold values for low-pressure determination determined in advance respectively for the resonance frequencies RF1 to RF4 under the reference imposed load condition, accurate low-pressure determination can be performed by making a comparison between each of the resonance frequencies RF1' to RF4' and its corresponding threshold value, regardless of the magnitude of the imposed load. Various methods can be conceived of as methods for setting the threshold values. For example, it is possible to calculate the resonance frequencies RF1 to RF4 in advance under the reference imposed load condition and a pressure decrease progression condition for issuing a low-pressure warning (e.g., the condition where all four tires have a pressure decrease of 20% if a low-pressure warning is to be issued when a pressure decrease of 20% occurs in all four tires), and to store the values in the storage device 15 as the threshold values for low-pressure determination. Alternatively, it is possible to calculate the values of the resonance frequencies RF1 to RF4 in advance under the reference imposed load condition and the NP condition, and to store the values in the storage device 15 as the reference values for low-pressure determination. In the case of the latter example, the storage device 15 stores in advance, in addition to the values of the resonance frequencies RF1 to RF4 under the NP condition, a threshold value that determines how much change in the resonance frequencies RF1 to RF4 from the aforementioned values of the resonance frequencies RF1 to RF4 during travel triggers a low-pressure warning, for example.

The coefficients b1 to b4 in the formula above respectively represent the amounts of change (decreases) in the resonance frequencies RF1 to RF4 corresponding to the amount of change (an increase) in DEL2. These values are determined for each combination of low pressure tires to be detected (including the case of a single tire). In the present embodiment, the resonance frequencies RF1' to RF4' are used for detecting the low-pressure state of all four tires as described below. Therefore, a value for detecting the low-pressure state of all four tires has been calculated in advance for each of the coefficients b1 to b4, and is stored in the storage device 15. The same applies to $DEL2_0$ The coefficients b1 to b4 can be set by various methods. For example, b1 to b4 can be determined by: collecting the data of DEL2 and RF1 to RF4 under various pressure decrease progression conditions and various imposed load conditions; deriving a regression line for each of the resonance frequencies RF1 to RF4 for each of the pressure decrease progression conditions; and taking the average of the inclinations of the regression lines.

Figure 11:
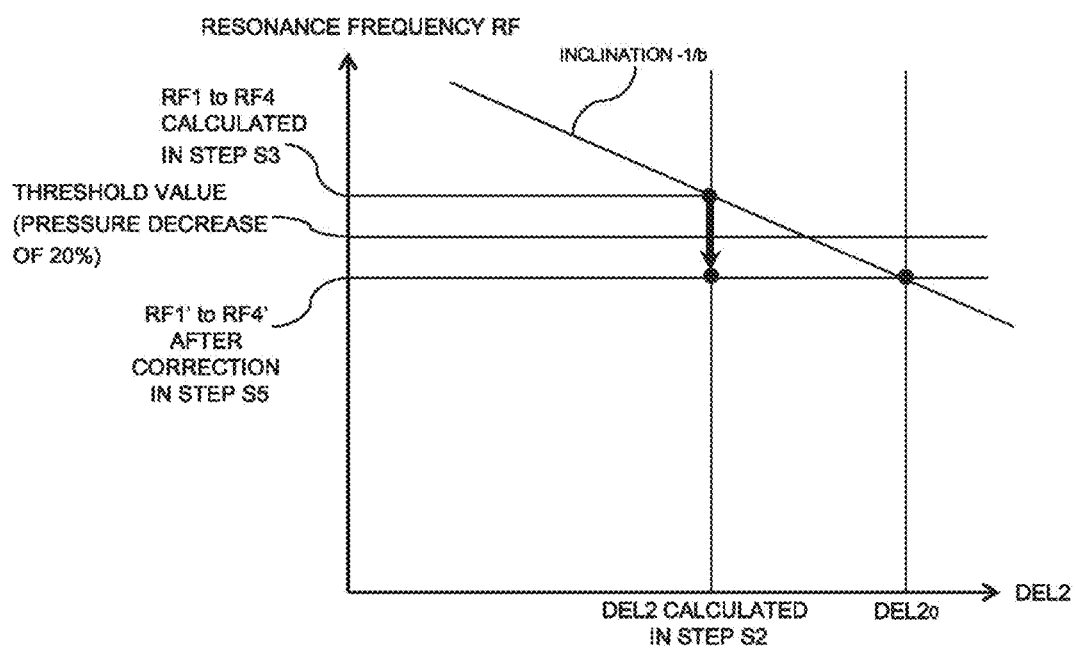
FIG. 11 is a diagram illustrating a principle of resonance frequency correction.

FIG. 11 is a diagram illustrating the principle and the effects of this correction. In the example shown in this drawing (low-pressure determination for all four tires), in the case where the resonance frequencies RF1 to RF4 calculated in step S3 are not corrected, the resonance frequencies RF1 to RF4 do not fall below their respective threshold values, and the low-pressure state is not detected. However, due to the correction in step S5, the influence of the imposed load can be taken into consideration. That is, RF1 to RF4 are respectively corrected to RF1' to RF4', and RF1' to RF4' fall below their respective threshold values. Thus, the low-pressure state can be correctly detected. FIG. 12 shows data indicating the results of actually correcting the values of the resonance frequency shown in FIG. 10 by using the method employed in step S5 described above. It can be seen that each value of the resonance frequency in the light load state LLVW and its corresponding value in the rated load state GVW under the same pressure decrease progression condition have a smaller difference in FIG. 12 than in FIG. 10. Thus, it can be seen from FIG. 12 that this correction can eliminate the influence of the imposed load.

Upon completing the correction of DEL2 and the resonance frequencies RF1 to RF4 in steps S4 and S5, the low-pressure detection unit 23 determines the low-pressure state (step S6). Specifically, the low-pressure detection unit 23 first attempts to detect, from among the above-described fifteen combinations of low pressure tires, the combinations (1) to (4), which correspond to the cases where one tire has low pressure, the combinations (6) to (9), which correspond to the cases where two tires have low pressure, and the combinations (11) to (14), which correspond to the case where three tires have low pressure, by using DEL1 to DEL3 calculated in step S2. More specifically, the low-pressure detection unit 23 determines which of the following applies to each of the index values DEL1 to DEL3: the index value has increased by the threshold value or more; the index value has decreased by the threshold value or more; or the amount of change in the index value is smaller than the threshold value. Based on the combination of the results, the low-pressure detection unit 23 determines the combination of low-pressure tires. The relationship between the combinations of changes in DEL1 to DEL3 and the combinations of low-pressure tires is as shown in Table 1, for example. Alternatively, in order to detect the combinations (1) to (4), which correspond to the cases where one tire has low pressure, the combinations (6) to (9), which correspond to the cases where two tires have low pressure, and the combinations (11) to (14), which correspond to the case where three tires have low pressure, it is possible to use the resonance frequencies RF1 to RF4 calculated in step S3, or the combination of DEL1 to DEL3 and RF1 to RF4. The index to be used for detecting the combinations of tires in the low-pressure state may be selected from DEL1 to DEL3 and RF1 to RF4 as appropriate.

TABLE 1

| | DEL1 | DEL2 | DEL3 |
|---|---|---|---|
| (1) Only FL has low pressure | Increase by threshold value or more | Increase by threshold value or more | Increase by threshold value or more |
| (2) Only FR has low pressure | Decrease by threshold value or more | Increase by threshold value or more | Decrease by threshold value or more |
| (3) Only RL has low pressure | Decrease by threshold value or more | Decrease by threshold value or more | Increase by threshold value or more |
| (4) Only RR has low pressure | Increase by threshold value or more | Decrease by threshold value or more | Decrease by threshold value or more |
| (6) Only FL and RL have low pressure | Amount of change is smaller than threshold value | Amount of change is smaller than threshold value | Increase by threshold value or more |

TABLE 1-continued

| | DEL1 | DEL2 | DEL3 |
|---|---|---|---|
| (7) Only FL and RR have low pressure | Increase by threshold value or more | Amount of change is smaller than threshold value | Amount of change is smaller than threshold value |
| (8) Only FR and RL have low pressure | Decrease by threshold value or more | Amount of change is smaller than threshold value | Amount of change is smaller than threshold value |
| (9) Only FR and RR have low pressure | Amount of change is smaller than threshold value | Amount of change is smaller than threshold value | Decrease by threshold value or more |
| (11) Only FL, FR, and RL have low pressure | Decrease by threshold value or more | Increase by threshold value or more | Increase by threshold value or more |
| (12) Only FL, FR, and RR have low pressure | Increase by threshold value or more | Increase by threshold value or more | Decrease by threshold value or more |
| (13) Only FL, RL, and RR have low pressure | Increase by threshold value or more | Decrease by threshold value or more | Increase by threshold value or more |
| (14) Only FR, RL and RR have low pressure | Decrease by threshold value or more | Decrease by threshold value or more | Decrease by threshold value or more |

Next, if the low-pressure state is not detected based on the above-described combinations of low-pressure tires, the low-pressure detection unit 23 attempts to detect the combination (5), which corresponds to the case where the two front tires have low pressure, and the combination (10), which corresponds to the case where the two rear tires have low pressure, by using the corrected index value DEL2'. More specifically, if DEL2' for low-pressure determination with respect to only the two front tires, calculated in step S4, is greater than or equal to the corresponding threshold value, the low-pressure detection unit 23 determines that only the two front tires FL and FR are in the low-pressure state. Similarly, if DEL2' for low-pressure determination with respect to only the two rear tires, calculated in step S4, is smaller than or equal to the corresponding threshold value, the low-pressure detection unit 23 determines that only the two rear tires RL and RR are in the low-pressure state.

Next, if the low-pressure state is not detected based on the above-described combinations of low-pressure tires, the low-pressure detection unit 23 attempts to detect the combination (15), which corresponds to the case where the four tires have low pressure, by using the corrected resonance frequencies RF1' to RF4'. More specifically, the low-pressure detection unit 23 compares RF1' to RF4' calculated in step S4 with their respective threshold values, and if any one of them is smaller than or equal to its corresponding threshold value, the low-pressure detection unit 23 determines that all four tires are in the low-pressure state. Note that it is possible to determine that all four tires are in the low-pressure state if two or more of, three or more of, or all of the four resonance frequencies RF1' to RF4' are smaller than or equal to their respective threshold values.

In the subsequent step S7, the low-pressure detection unit 23 determines whether or not a low-pressure state has been detected in step S6 based on any of the combinations (1) to (15). If a low-pressure state has not been detected based on any of the combinations, the pressure reduction detection unit 23 ends the low-pressure detection processing. If the low-pressure state has been detected based on any of the combinations, step S8 is performed next.

In step S8, the low-pressure warning unit 24 outputs a low-pressure warning via the warning indicator 3. The warning indicator 3 may output a warning specifying the tires in the low-pressure state, or output a warning only indicating that some of the tires are in the low-pressure state. The low-pressure warning may be output as sound.

3. Modifications

Although one embodiment of the present invention has been described above, the present invention is not limited to the embodiment above, and various modifications can be made without departing from the spirit of the present invention. For example, the following modifications can be made. Note that the spirits of the following modifications can be combined as appropriate.

3-1

Figure 13:
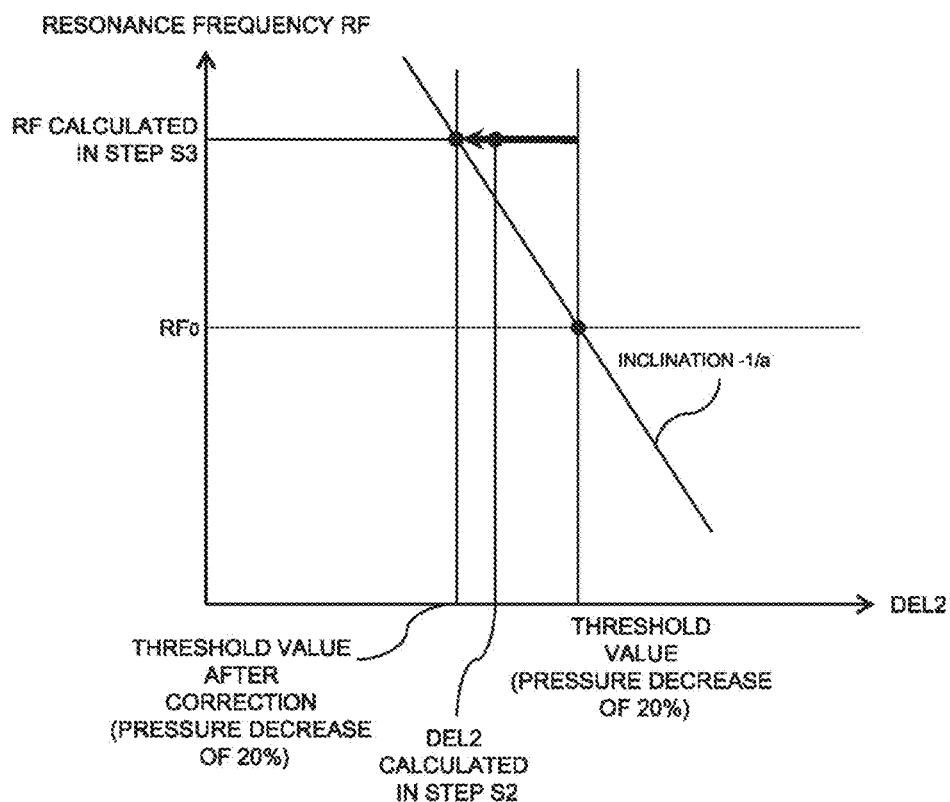
FIG. 13 is a diagram illustrating a principle of DEL2 correction according to a modification example.
Figure 14:
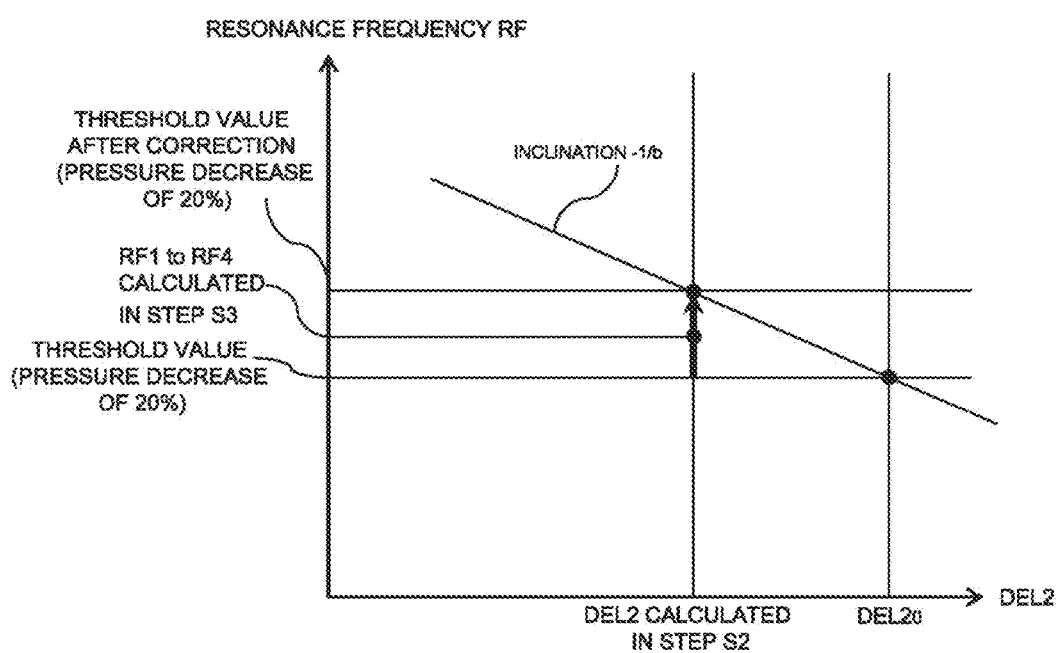
FIG. 14 is a diagram illustrating a principle of resonance frequency correction according to another modification example.

In the embodiment above, DEL2 and the resonance frequencies RF1 to RF4 are corrected in steps S4 and S5. Alternatively, the threshold values for low-pressure determination used in step S6 may be corrected based on the parameters a, $RF_0$, b1 to b4, and $DEL2_0$ that indicate the linear relationship between DEL2 and the resonance frequencies RF1 to RF4. FIG. 13 is a diagram illustrating the principle of correcting the threshold value for DEL2, and FIG. 14 is a diagram illustrating the principle of correcting the threshold values for resonance frequencies RF1 to RF4. In these cases as well, it is possible to perform low-pressure determination from which the influence of the imposed load on the vehicle 1 is eliminated. Note that it is also possible to correct all of DEL2, the resonance frequencies RF1 to RF4, and the threshold values.

3-2

Figure 15:
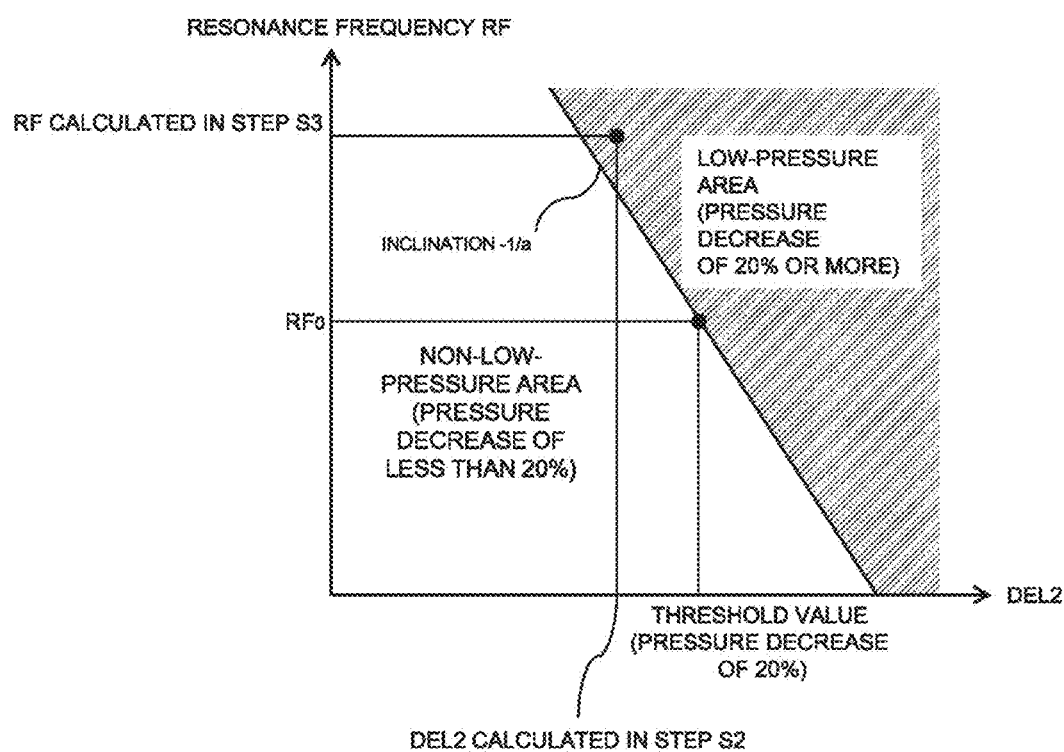
FIG. 15 is a diagram illustrating a principle of low-pressure determination according to yet another modification example.
Figure 16:
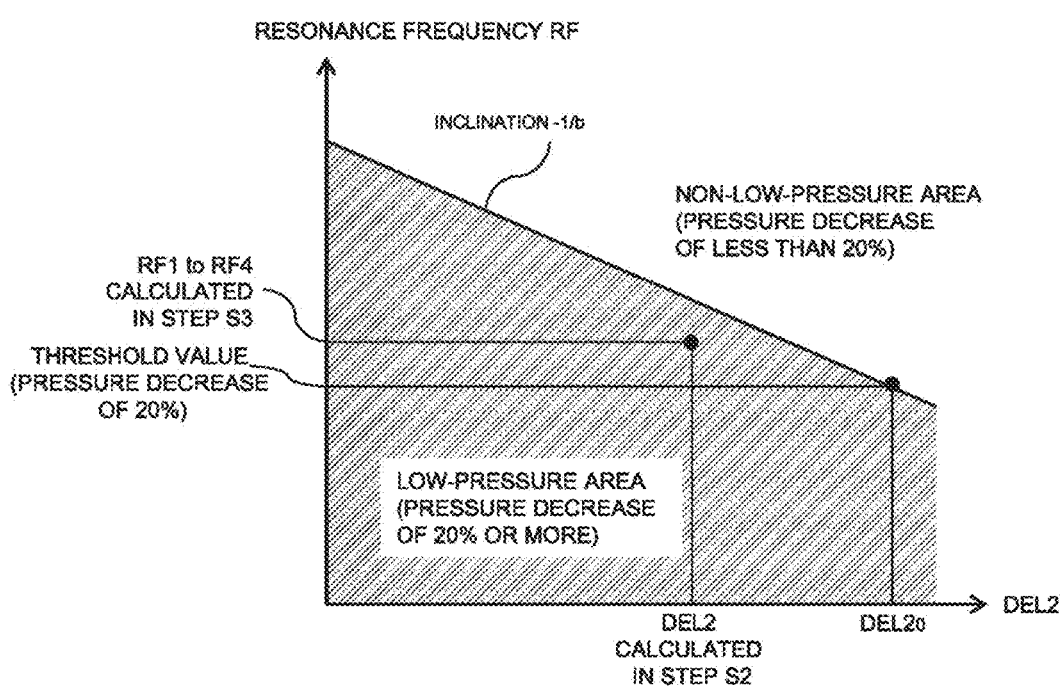
FIG. 16 is a diagram illustrating a principle of low-pressure determination according to yet another modification example

In the embodiment above, DEL2 and the resonance frequencies RF1 to RF4 are corrected in steps S4 and S5. However, these corrections may be omitted. In this case, the low-pressure determination in step S6 may be performed based on whether the point specified by DEL2 and the resonance frequencies RF1 to RF4 calculated in steps S2 and S3 is located above or below a predetermined straight line in the DEL2-resonance frequency space. The predetermined straight line mentioned here is a straight line that is specified based on the parameters a, $RF_0$, b1 to b4, and $DEL2_0$ that indicate the linear relationship between DEL2 and the resonance frequencies RF1 to RF4, and the threshold values. FIG. 15 is a diagram illustrating the principle of the correction made to determine the low-pressure state of only the two front tires, and FIG. 16 is a diagram illustrating the principle of the correction made to determine the low-pressure state of all four tires. In these cases as well, it is possible to perform low-pressure determination from which the influence of the imposed load on the vehicle 1 is eliminated.

3-3

In the embodiment above, a description has been given of a method for detecting the low-pressure states of only the two front tires, only the two rear tires, or all four tires. However, in the cases of detecting the low-pressure states of other combinations of tires (including the cases of a single tire) as well, it is possible to eliminate the influence of the imposed load from at least one of DEL2 and the resonance frequencies RF1 to RF4 calculated in steps S2 and S3, based on the linear relationship between DEL2 and the resonance frequencies RF1 to RF4. In such cases, however, it is necessary to calculate and set the parameters (a, $RF_0$, b1 to b4, $DEL2_0$, the threshold values, etc.) that represent the linear relationship after actually reducing the pressure in the tires related to the combination to be detected.

3-4

The tire low-pressure detection processing according to one aspect of the present invention is not limited by the driving method employed in a four-wheel vehicle, and is applicable to FF vehicles, FR vehicles, MR vehicles, and 4WD vehicles. Furthermore, the present invention is applicable not only to four-wheel vehicles, but also to three-wheel vehicles, six-wheel vehicles, and so on.

REFERENCE SIGNS LIST

1 Vehicle
2 Detection device (Computer)
21 DEL calculation unit (Index value calculation unit)
22 RF calculation unit (Resonance frequency calculation unit)
23 Low-pressure detection unit
24 Low-pressure warning unit
7 Program
DEL2 Low-pressure index value
FL Front left tire
FR Front right tire
RL Rear left tire
RR Rear right tire
V1 Rotation speed of front left tire
V2 Rotation speed of front right tire
V3 Rotation speed of rear left tire
V4 Rotation speed of rear right tire
R1 Resonance frequency of front left tire
R2 Resonance frequency of front right tire
R3 Resonance frequency of rear left tire
R4 Resonance frequency of rear right tire

The invention claimed is:

1. A detection system for detecting a low-pressure state of at least one predetermined tire out of a plurality of tires attached to a vehicle, comprising:
a wheel speed sensor attached to each of the plurality of tires and configured to detect wheel speed information from each of the plurality of tires, wherein the plurality of tires include at least a front tire and a rear tire;
a warning indicator; and
a detection device including an I/O interface and a CPU, each wheel speed sensor being connected to the detection device via a communication line and the I/O interface, the wheel information detected by each wheel speed sensor being transmitted to the detection device in real time, the CPU of the detection device being configured to:
retrieve wheel speed information of the front tire and the rear tire out of the plurality of tires from the wheel speed sensor;
calculate a low-pressure index value DEL2 from wheel speed information of the front tire and the rear tire out of the plurality of tires, the low-pressure index value DEL2 being a comparison value obtained by comparing a rotation speed of the front tire and a rotation speed of the rear tire, and the low-pressure index value DEL2 being an index value that increases as the rotation speed of the front tire increases and decreases as the rotation speed of the rear tire increases, or an index value that increases as the rotation speed of the rear tire increases and decreases as the rotation speed of the front tire increases;
perform a frequency analysis on a waveform signals of wheel speed information of at least one tire out of the plurality of tires to calculate a resonance frequency RF of said at least one tire;
calculate a corrected value DEL2' based on the following formula:

$$DEL2'=DEL2-A*(RF-RF_0),$$

wherein A is a predetermined parameter, being a value corresponding to an inclination of a regression line between the resonance frequency RF and the low-pressure index value DEL2 under the same low-pressure condition, and $RF_0$ is a predetermined reference resonance frequency, being a value of the resonance frequency RF under a reference low-pressure condition and a reference imposed load condition;
determine the low-pressure state of said at least one predetermined tire by comparing the corrected value DEL2' and a predetermined threshold value; and
control the warning indicator to issue a warning representing occurrence of a pressure decrease when the low-pressure state of said at least one predetermined tire is determined, wherein the determined low-pressure state of said at least one predetermined tire eliminates an influence of an imposed load on the vehicle, thereby avoiding misdetection and improving accuracy of the low-pressure determination.

2. The detection system according to claim 1, wherein said at least one predetermined tire is two front tires or two rear tires.

3. The detection system according to claim 1, wherein said at least one predetermined tire is four tires that include two front tires and two rear tires.

4. A detection method for detecting a low-pressure state of at least one predetermined tire out of a plurality of tires attached to a vehicle by a detection system, wherein the detection system includes:
a wheel speed sensor attached to each of the plurality of tires and configured to detect wheel speed information from each of the plurality of tires, wherein the plurality of tires include at least a front tire and a rear tire;
a warning indicator; and
a detection device including an I/O interface and a CPU, each wheel speed sensor being connected to the detection device via a communication line and the I/O interface, the wheel information detected by each wheel speed sensor being transmitted to the detection device in real time,
the method comprising the steps of:
detecting wheel speed information from each of the plurality of tires by the wheel speed sensors attached to each of the plurality of tires;
retrieving, by the CPU of the detection device, wheel speed information of the front tire and the rear tire out of the plurality of tires from the wheel speed sensors;
calculating, by the CPU of the detection device, a low-pressure index value DEL2 from wheel speed information of the front tire and the rear tire out of the plurality of tires, the low-pressure index value DEL2 being a comparison value obtained by comparing a rotation speed of the front tire and a rotation speed of the rear tire, and the low-pressure index value DEL2 being an index value that increases as the rotation speed of the front tire increases and decreases as the rotation speed of the rear tire increases, or an index value that increases as the rotation speed of the rear tire increases and decreases as the rotation speed of the front tire increases;
performing, by the CPU of the detection device, a frequency analysis on a waveform signals of wheel speed information of at least one tire out of the plurality of tires to calculate a resonance frequency RF of said at least one tire;

calculating, by the CPU of the detection device, a corrected value DEL2' based on the following formula:

$$DEL2'=DEL2-A*(RF-RF_0),$$

wherein A is a predetermined parameter, being a value corresponding to an inclination of a regression line between the resonance frequency RF and the low-pressure index value DEL2 under the same low-pressure condition, and $RF_0$ is a predetermined reference resonance frequency, being a value of the resonance frequency RF under a reference low-pressure condition and a reference imposed load condition;

determining, by the CPU of the detection device, the low-pressure state of said at least one predetermined tire by comparing the corrected value DEL2' and a predetermined threshold value; and issuing, by the warning indicator, a warning representing occurrence of a pressure decrease when the low-pressure state of said at least one predetermined tire is determined, wherein the determined low-pressure state of said at least one predetermined tire eliminates an influence of an imposed load on the vehicle, thereby avoiding misdetection and improving accuracy of the low-pressure determination.

5. A non-transitory computer readable medium storing a detection program for detecting a low-pressure state of at least one predetermined tire out of a plurality of tires attached to a vehicle, the non-transitory computer readable medium being comprised in a detection system which includes:
   a wheel speed sensor attached to each of the plurality of tires and configured to detect wheel speed information from each of the plurality of tires, wherein the plurality of tires include at least a front tire and a rear tire;
   a warning indicator; and
   a detection device including an I/O interface and a CPU, each wheel speed sensor being connected to the detection device via a communication line and the I/O interface, the wheel information detected by each wheel speed sensor being transmitted to the detection device in real time,
   the detection program causing the CPU of the detection device to perform the steps of:
   retrieving wheel speed information of the front tire and the rear tire out of the plurality of tires from wheel speed sensors attached to each of the plurality of tires;
   calculating a low-pressure index value DEL2 from wheel speed information of the front tire and the rear tire out of the plurality of tires, the low-pressure index value DEL2 being a comparison value obtained by comparing a rotation speed of the front tire and a rotation speed of the rear tire, and the low-pressure index value DEL2 being an index value that increases as the rotation speed of the front tire increases and decreases as the rotation speed of the rear tire increases, or an index value that increases as the rotation speed of the rear tire increases and decreases as the rotation speed of the front tire increases;
   performing a frequency analysis on a waveform signals of wheel speed information of at least one tire out of the plurality of tires to calculate a resonance frequency RF of said at least one tire;
   calculating a corrected value DEL2' based on the following formula:

$$DEL2'=DEL2-A*(RF-RF_0),$$

wherein A is a predetermined parameter, being a value corresponding to an inclination of a regression line between the resonance frequency RF and the low-pressure index value DEL2 under the same low-pressure condition, and $RF_0$ is a predetermined reference resonance frequency, being a value of the resonance frequency RF under a reference low-pressure condition and a reference imposed load condition;
   determining the low-pressure state of said at least one predetermined tire by comparing the corrected value DEL2' and a predetermined threshold value; and
   controlling the warning indicator to issue a warning representing occurrence of a pressure decrease when the low-pressure state of said at least one predetermined tire is determined, wherein the determined low-pressure state of said at least one predetermined tire eliminates an influence of an imposed load on the vehicle, thereby avoiding misdetection and improving accuracy of the low-pressure determination.

6. A detection system for detecting a low-pressure state of at least one predetermined tire out of a plurality of tires attached to a vehicle, comprising:
   a wheel speed sensor attached to each of the plurality of tires and configured to detect wheel speed information from each of the plurality of tires, wherein the plurality of tires include at least a front tire and a rear tire;
   a warning indicator; and
   a detection device including an I/O interface and a CPU, each wheel speed sensor being connected to the detection device via a communication line and the I/O interface, the wheel information detected by each wheel speed sensor being transmitted to the detection device in real time, the CPU of the detection device being configured to:
   retrieve wheel speed information of the front tire and the rear tire out of the plurality of tires from the wheel speed sensor;
   calculate a low-pressure index value DEL2 from wheel speed information of the front tire and the rear tire out of the plurality of tires, the low-pressure index value DEL2 being a comparison value obtained by comparing a rotation speed of the front tire and a rotation speed of the rear tire, and the low-pressure index value DEL2 being an index value that increases as the rotation speed of the front tire increases and decreases as the rotation speed of the rear tire increases, or an index value that increases as the rotation speed of the rear tire increases and decreases as the rotation speed of the front tire increases;
   perform a frequency analysis on a waveform signals of wheel speed information of at least one tire out of the plurality of tires to calculate a resonance frequency RF of said at least one tire;
   calculate a corrected threshold value TH' based on the following formula:

$$TH'=TH-A*(RF-RF_0),$$

wherein A is a predetermined parameter, being a value corresponding to an inclination of a regression line between the resonance frequency RF and the low-pressure index value DEL2 under the same low-pressure condition, $RF_0$ is a predetermined reference resonance frequency, being a value of the resonance frequency RF under a reference low-pressure condition and a reference imposed load condition, and TH is a predetermined threshold value;

determine the low-pressure state of said at least one predetermined tire by comparing the low-pressure index value DEL2 and the corrected threshold value TH'; and control the warning indicator to issue a warning representing occurrence of a pressure decrease when the low-pressure state of said at least one predetermined tire is determined, wherein the determined low-pressure state of said at least one predetermined tire eliminates an influence of an imposed load on the vehicle, thereby avoiding misdetection and improving accuracy of the low-pressure determination.

7. A detection system for detecting a low-pressure state of at least one predetermined tire out of a plurality of tires attached to a vehicle, comprising:

a wheel speed sensor attached to each of the plurality of tires and configured to detect wheel speed information from each of the plurality of tires, wherein the plurality of tires include at least a front tire and a rear tire;

a warning indicator; and a detection device including an I/O interface and a CPU, each wheel speed sensor being connected to the detection device via a communication line and the I/O interface, the wheel information detected by each wheel speed sensor being transmitted to the detection device in real time, the CPU of the detection device being configured to:

retrieve wheel speed information of the front tire and the rear tire out of the plurality of tires from the wheel speed sensor;

calculate a low-pressure index value DEL2 from wheel speed information of the front tire and the rear tire out of the plurality of tires, the low-pressure index value DEL2 being a comparison value obtained by comparing a rotation speed of the front tire and a rotation speed of the rear tire, and the low-pressure index value DEL2 being an index value that increases as the rotation speed of the front tire increases and decreases as the rotation speed of the rear tire increases, or an index value that increases as the rotation speed of the rear tire increases and decreases as the rotation speed of the front tire increases;

perform a frequency analysis on a waveform signals of wheel speed information of said at least one predetermined tire to calculate a resonance frequency RF of said at least one predetermined tire;

calculate a corrected value RF' based on the following formula:

$$RF'=RF-B*(DEL2-DEL2_0),$$

wherein B is a predetermined parameter, being a value corresponding to an inclination of a regression line between the resonance frequency RF and the low-pressure index value DEL2 under the same low-pressure condition, and $DEL2_0$ is a predetermined reference low-pressure index value, being a value of the low-pressure index value DEL2 under a reference low-pressure condition and a reference imposed load condition;

determine the low-pressure state of said at least one predetermined tire by comparing the corrected value RF' and a predetermined threshold value; and control the warning indicator to issue a warning representing occurrence of a pressure decrease when the low-pressure state of said at least one predetermined tire is determined, wherein the determined low-pressure state of said at least one predetermined tire eliminates an influence of an imposed load on the vehicle, thereby avoiding misdetection and improving accuracy of the low-pressure determination.

8. A detection system for detecting a low-pressure state of at least one predetermined tire out of a plurality of tires attached to a vehicle, comprising:

a wheel speed sensor attached to each of the plurality of tires and configured to detect wheel speed information from each of the plurality of tires, wherein the plurality of tires include at least a front tire and a rear tire;

a warning indicator; and a detection device including an I/O interface and a CPU, each wheel speed sensor being connected to the detection device via a communication line and the I/O interface, the wheel information detected by each wheel speed sensor being transmitted to the detection device in real time, the CPU of the detection device being configured to:

retrieve wheel speed information of the front tire and the rear tire out of the plurality of tires from the wheel speed sensor;

calculate a low-pressure index value DEL2 from wheel speed information of the front tire and the rear tire out of the plurality of tires, the low-pressure index value DEL2 being a comparison value obtained by comparing a rotation speed of the front tire and a rotation speed of the rear tire, and the low-pressure index value DEL2 being an index value that increases as the rotation speed of the front tire increases and decreases as the rotation speed of the rear tire increases, or an index value that increases as the rotation speed of the rear tire increases and decreases as the rotation speed of the front tire increases;

perform a frequency analysis on a waveform signals of wheel speed information of said at least one predetermined tire to calculate a resonance frequency RF of said at least one predetermined tire;

calculate a corrected threshold value TH' based on the following formula:

$$TH'=TH-B*(DEL2-DEL2_0),$$

wherein B is a predetermined parameter, being a value corresponding to an inclination of a regression line between the resonance frequency RF and the low-pressure index value DEL2 under the same low-pressure condition, $DEL2_0$ is a predetermined reference low-pressure index value, being a value of the low-pressure index value DEL2 under a reference low-pressure condition and a reference imposed load condition, and TH is a predetermined threshold value;

determine the low-pressure state of said at least one predetermined tire by comparing the resonance frequency RF and the corrected threshold value TH'; and control the warning indicator to issue a warning representing occurrence of a pressure decrease when the low-pressure state of said at least one predetermined tire is determined, wherein the determined low-pressure state of said at least one predetermined tire eliminates an influence of an imposed load on the vehicle, thereby avoiding misdetection and improving accuracy of the low-pressure determination.

9. A detection system for detecting a low-pressure state of at least one predetermined tire out of a plurality of tires attached to a vehicle, comprising:

a wheel speed sensor attached to each of the plurality of tires and configured to detect wheel speed information from each of the plurality of tires, wherein the plurality of tires include at least a front tire and a rear tire;

a warning indicator; and a detection device including an I/O interface and a CPU, each wheel speed sensor being connected to the detection device via a communication line and the I/O interface, the wheel information detected by each wheel speed sensor being transmitted to the detection device in real time, the CPU of the detection device being configured to:

retrieve wheel speed information of the front tire and the rear tire out of the plurality of tires from the wheel speed sensor;

calculate a low-pressure index value DEL2 from wheel speed information of the front tire and the rear tire out of the plurality of tires, the low-pressure index value DEL2 being a comparison value obtained by comparing a rotation speed of the front tire and a rotation speed of the rear tire, and the low-pressure index value DEL2 being an index value that increases as the rotation speed of the front tire increases and decreases as the rotation speed of the rear tire increases, or an index value that increases as the rotation speed of the rear tire increases and decreases as the rotation speed of the front tire increases;

perform a frequency analysis on a waveform signals of wheel speed information of said at least one predetermined tire to calculate a resonance frequency RF of said at least one predetermined tire;

determine the low-pressure state of said at least one predetermined tire when a point that is specified by the low-pressure index value DEL2 and the resonance frequency RF belongs to a low-pressure area in a DEL2-RF space, wherein the DEL2-RF space has an axis of the low-pressure index value DEL2 and an axis of the resonance frequency RF, and a borderline between the low-pressure area and a non-low-pressure area is a regression line between the resonance frequency RF and the low-pressure index value DEL2 under a low-pressure condition corresponding to a low-pressure detection level for detecting the low-pressure state of said at least one predetermined tire; and control the warning indicator to issue a warning representing occurrence of a pressure decrease when the low-pressure state of said at least one predetermined tire is determined, wherein the determined low-pressure state of said at least one predetermined tire eliminates an influence of an imposed load on the vehicle, thereby avoiding misdetection and improving accuracy of the low-pressure determination.

\* \* \* \* \*